2,822,409

DISTILLING ALCOHOLS IN PRESENCE OF AMINES

Bernard H. Gwynn, Fawn Township, Allegheny County, and Arthur C. Whitaker, Fox Chapel, Pa., assignors to Gulf Research & Development Company, Pittsburgh, Pa., a corporation of Delaware No Drawing. Application April 29, 1954
Serial No. 426,591

9 Claims. (Cl. 260—638)

This invention relates to a process for preventing decomposition of alcohols during their distillation and particularly to a process for preventing decomposition of alcohols produced in the Oxo process during their distillation.

In the preparation of alcohols, the final alcohol product obtained quite often contains some impurities that must first be removed from the product before an acceptable alcohol can be produced. These impurities can find their way into the alcohol product from several sources but chiefly from the reactants employed in the preparation of the alcohol product and the equipment used. The alcohol product can be purified to obtain a substantially pure alcohol by the relatively simple expedient of distillation. However, under some of the conditions employed in the distillation of the alcohol product, particularly with respect to the temperature, the impurities seriously interfere with satisfactory operation of the distillation stage and an appreciable amount of the alcohol is lost during the process.

This difficulty has been found to exist particularly in the distillation of alcohols produced in the Oxo process. Briefly, the Oxo process comprises two stages for the production of alcohols. In the first stage aldehydes are synthesized, while in the second the aldehydes are hydrogenated to the corresponding alcohols.

The first stage of the Oxo process, sometimes called the hydroformylation reaction stage, generally comprises reacting a mixture comprising an olefin or olefins, hydrogen and carbon monoxide in the presence of a hydroformylation catalyst at an elevated superatmospheric pressure, such as a pressure of about 1500 to about 4500 pounds per square inch gauge, and an elevated temperature, such as a temperature of about 100° to about 600° F., to produce a hydroformylation or oxygenated organic product comprising chiefly aldehydes having one more carbon atom than the original olefins and smaller amounts of alcohols, acetals, and other organic products. Thus, if heptenes are charged to the hydroformylation stage of an Oxo unit, octyl aldehydes are produced.

The hydroformylation product stream also contains, in addition to the products mentioned above, a catalytic metal carbonyl or small amounts of a catalytic metal salt of an organic acid. The catalytic metal is originally introduced into the hydroformylation reaction stage as the carbonyl, or is converted to the carbonyl in the reaction zone. Cobalt or iron, generally in the form of an organic salt such as cobalt naphthenate or the cobalt salt of 2-ethylhexanoic acid, is usually employed as the catalytic metal. The walls of the hydroformylation reactor and the transfer lines used in the hydroformylation stage are usually made of iron or its alloys. During the hydroformylation stage some of the metal in the walls of the hydroformylation reactor and transfer lines finds its way into the hydroformylation reaction product where it generally appears as a metal carbonyl. In this way iron carbonyl is produced when the walls of the reactor and the transfer lines are constructed of iron and carbonyls of alloying metals are also produced when the walls are constructed of metal alloys. The alloying metal carbonyls, in addition to iron carbonyl, usually comprise those of nickel, chromium, and molybdenum.

Since these metallic carbonyls seriously interfere with the subsequent reactions to which the hydroformylation reaction product is to be subjected, it is a common expedient to pass the hydroformylation reaction product to a demetalling zone wherein it is subjected to a demetalling treatment. This can be done in numerous ways but is often accomplished by the application of heat to the hydroformylation reaction product to decompose the metal carbonyls and deposit the elemental metal resulting from such decomposition in the demetalling zone, preferably on an absorbent material such as pumice. While the demetalling step is effective to remove substantially all of the hydroformylation catalyst or its decomposition or reaction product from the hydroformylation reaction product, it is exceedingly difficult to remove completely these substances from the hydroformylation reaction product, and hence the effluent from the demetalling zone generally contains traces of these substances.

The hydroformylation reaction product from the demetalling zone is then passed to the second or hydrogenation stage of the Oxo process where the aldehydes in the hydroformylation reaction product are hydrogenated to the corresponding alcohol under hydrogenating conditions, e. g. a temperature in the range of about 300° to about 450° F. and a pressure in the range of about 500 pounds to about 3000 pounds per square inch, in the presence of a hydrogenation catalyst such as nickel or nickel oxide. Here, too, the catalytic material or its decomposition or reaction products appear in the effluent from the hydrogenation stage, and it is extremely difficult to obtain an alcohol which does not contain at least a trace of these impurities.

The alcohol product obtained from the second stage of the Oxo process comprises alcohols, traces of the hydroformylation and hydrogenation catalysts, as well as their decomposition and reaction products as set forth above, some unreacted olefins and aldehydes, aldols, etc. In order to purify this product and obtain the desired alcohol, the alcohol product is usually subjected to a distillation treatment. During the distillation step, however, an appreciable amount of the alcohol is decomposed with the result that the yield of pure alcohol obtained is reduced.

It is believed that the traces of catalytic metals and their decomposition and reaction products from the two stages of the Oxo process which are present in the alcohol product act as catalyst for the decomposition of the alcohol under the distillation conditions employed. Initially, the alcohol is probably dehydrogenated to the corresponding aldehyde. This aldehyde is believed to be further decomposed to a normal hydrocarbon by the release of carbon monoxide and additionally condenses with itself to form aldol condensation products.

We have discovered that alcohols containing impurities, particularly alcohols obtained in the Oxo process, can be purified by distillation and the amount of alcohol generally lost thereby can be substantially reduced by conducting the distillation process in the presence of an additive which will not boil out but will remain in the distillation mixture at the distillation temperature throughout the distillation stage and which will render the impurities unreactive and non-catalytic toward the decomposition reaction at distillation temperatures.

Included among the groups of compounds which we have found to be particularly effective in the practice of our invention are any amines which will not boil out but will remain in the distillation mixture at the temperature employed in distilling the alcohol, particularly aliphatic amines having a total of 2 to about 20 carbon atoms in the molecule and aromatic amines having a total of about 6 to about 20 carbon atoms in the molecule. Examples of amines which can be used include primary amines such as hexylamine and octadecylamine; polyamines such as triethylenetetramine, ethylenediamine, diethylenetriamine, tetraethylenepentamine, and propylenediamine; hydroxyamines such as ethanolamine, diethanolamine, and isopropanolamine; and aromatic amines such as diphenylamine and monoethylaniline. It is believed that these amines act in one of two ways to render the impurities present in the alcohol product non-catalytic toward the decomposition of alcohols which is susceptible of taking place during the distillation stage. When the impurity is present in elemental form as the metal, for example as cobalt, nickel, iron, etc., the amine is believed to form a coating about the metal and thus renders it ineffective as catalyst. In cases where the impurity is present in ionizable form, for example as a salt such as the cobalt salt of 2-ethylhexanoic acid, we believe the amine forms with the impurity present a Werner-type complex stable at the distillation temperatures to be employed and boiling at a temperature above the boiling point of the alcohol.

Since only traces of the impurities or catalytic material are present in the alcohol product to be distilled, only very small amounts of the substances defined above or combinations thereof need be added thereto prior to distillation in order to render the impurities unreactive and non-catalytic toward the decomposition of the alcohol. Accordingly, while large amounts of the additives can be employed with good effect, in general we prefer to employ above about 0.05, preferably between about 0.1 to about 0.5, weight percent of the additive, based upon the weight of the alcohol product to be treated.

While our invention can be employed in the purification by distillation of mixtures containing alcohols of any kind, it is particularly applicable to the treatment of alcohols boiling above about 100° C. since decomposition of alcohols is not a serious problem with those having boiling points below about 100° C., for example ethyl alcohol. This invention has been found to be especially effective in distilling an alcohol product obtained from the Oxo process and comprising isooctyl alcohol and the catalytic impurities noted above.

This invention can best be illustrated by reference to several distillation runs which were made on alcohol products containing various amounts of impurities capable of acting as catalyst during the distillation, as well as alcohol products containing in addition compounds capable of rendering the impurities ineffective as catalysts. In each of the runs, 200 grams of isooctyl alcohol was used. Raney nickel as an impurity was present in an amount of 2½ percent by weight (5 grams), while the iron, nickel and cobalt salts of 2-ethylhexanoic acid were present in an amount of 5 percent by weight (10 grams). The amount of additive incorporated in the alcohol product in each instance was 2½ percent by weight (5 grams). The alcohol product was refluxed and distilled at a temperature of about 180° C. and atmospheric pressure for about 24 hours to simulate commercial plant operation. The results of these runs are tabulated below in Table 1.

Table 1

| Impurity | Additive | Loss During Reaction, Wt. Percent | Material Boiling Below $C_8$ Alcohol, Wt. Percent | Residue, Wt. Percent |
|---|---|---|---|---|
| 1. Nickel Salt of 2-ethylhexanoic Acid. | None | 4.6 | 1.9 | 39.3 |
| 2. Iron Salt of 2-ethylhexanoic Acid. | do | Negligible | 0.2 | 15.0 |
| 3. Cobalt Salt of 2-ethylhexanoic Acid. | do | 3.0 | 1.0 | 24.0 |
| 4. Raney Nickel | do | 19.1 | 5.7 | 10.1 |
| 5. Nickel Salt of 2-ethylhexanoic Acid. | Triethylenetetramine. | Negligible | 0.7 | 3.0 |
| 6. Raney Nickel | do | 3.3 | 0.3 | 3.0 |

The data in Table 1 clearly show the marked improvement obtained in the distillation of an alcohol product containing impurities in accordance with our invention. In the case of alcohols containing a metal salt of an organic acid as impurity, it should be noted that when the alcohol containing the nickel salt of 2-ethylhexanoic acid as impurity was distilled, 39.3 percent by weight of residue (polymers due to aldol condensation and alcohol decomposition products, as well as impurities originally in the alcohol product) resulted. The addition of a relatively small amount of triethylenetetramine to this alcohol cut the loss by about 90 percent, specifically down to 3.0 percent by weight. It will be seen that the addition of a small amount of additive to an alcohol containing Raney nickel as an impurity resulted in a decrease of residue from 10.1 to 3.0 percent by weight. In addition, in the distillation of the alcohol containing Raney nickel as impurity but no additive, 19.1 percent by weight of the original product was lost during the reaction as carbon monoxide, hydrogen, water vapor and heptane, and 5.7 percent by weight of material boiling below $C_8$ alcohol remained behind, probably heptane retained in the condenser system and unreacted aldehyde. The addition of the additive to the alcohol containing Raney nickel as impurity resulted in a substantial decrease of material lost during the reaction as well as material boiling below $C_8$ alcohol. In the former, after the addition, the amount lost during the reaction was but 3.3 percent by weight, while in the latter only 0.3 percent by weight of material boiling below $C_8$ alcohol remained. Similar improvements were obtained in this respect with the addition of triethylenetetramine to the alcohol containing the nickel salt as impurity.

Obviously, many modifications and variations of the invention, as hereinabove set forth, can be made without departing from the spirit and scope thereof, and therefore only such limitations should be imposed as are indicated in the appended claims.

We claim:

1. A process for preventing the decomposition during its distillation of an alcohol product containing metallic impurities which comprises incorporating therein, prior to distillation, an amine selected from the group consisting of primary and secondary aliphatic amines having a total of 2 to about 20 carbon atoms in the molecule and primary and secondary aromatic amines having a total of about 6 to about 20 carbon atoms in the molecule which will not boil out but will remain in the distillation mixture at the distillation temperature throughout the distillation stage and which will render said impurities unreactive and non-catalytic toward decomposition of the alcohol, and thereafter distilling said alcohol product.

2. A process for preventing the decomposition during its distillation of an alcohol product obtained in the Oxo process comprising an alcohol and metallic impurities which comprises incorporating therein, prior to distillation, an amine selected from the group consisting of primary and secondary aliphatic amines having a total of 2 to about 20 carbon atoms in the molecule and primary and secondary aromatic amines having a total of about 6 to about 20 carbon atoms in the molecule which will not boil out but will remain in the distillation mixture at the distillation temperature throughout the distillation stage and which will render said impurities unreactive and non-catalytic toward decomposition of the alcohol, and thereafter distilling said alcohol product.

3. A process for preventing the decomposition during its distillation of an alcohol product obtained in the Oxo process comprising an alcohol and metallic impurities which comprises incorporating therein, prior to distillation, a polyamine which will not boil out but will remain in the distillation mixture at the distillation temperature throughout the distillation stage, and thereafter distilling said alcohol product.

4. A process for preventing the decomposition during its distillation of an alcohol product obtained in the Oxo process comprising an alcohol and metallic impurities comprising nickel which comprises incorporating therein, prior to distillation, triethylenetetramine, and thereafter distilling said alcohol product.

5. A process for the production of alcohols which comprises reacting a mixture comprising an olefin, carbon monoxide and hydrogen in the presence of a metallic hydroformylation reaction catalyst at an elevated superatmospheric pressure and elevated temperature to obtain a hydroformylation reaction mixture comprising an aldehyde, said hydroformylation catalyst and its decomposition and reaction products, treating said hydroformylation reaction product to remove substantially all of said hydroformylation catalyst and its decomposition and reaction products therefrom, reacting said latter treated product under hydrogenating conditions in the presence of a nickel hydrogenation catalyst to obtain an alcohol product comprising alcohols and small amounts of hydroformylation and hydrogenation catalysts and their reaction and decomposition products as impurities, incorporating in said alcohol product, prior to distillation, an amine selected from the group consisting of primary and secondary aliphatic amines having a total of 2 to about 20 carbon atoms in the molecule and primary and secondary aromatic amines having a total of about 6 to about 20 carbon atoms in the molecule which will not boil out but will remain in the alcohol product at the distillation temperatures to be employed in distilling said alcohol product and will render said impurities unreactive and non-catalytic toward decomposition of the alcohol, and thereafter distilling said latter product to obtain alcohol.

6. A process for the production of alcohols which comprises reacting a mixture comprising an olefin, carbon monoxide and hydrogen in the presence of a metallic hydroformylation reaction catalyst at an elevated superatmospheric pressure and elevated temperature to obtain a hydroformylation reaction mixture comprising an aldehyde, said hydroformylation catalyst and its decomposition and reaction products, treating said hydroformylation reaction product to remove substantially all of said hydroformylation catalyst and its decomposition and reaction products therefrom, reacting said latter treated product under hydrogenating conditions in the presence of a hydrogenation catalyst comprising nickel to obtain an alcohol product comprising alcohols and small amounts of hydroformylation and hydrogenation catalysts and their reaction and decomposition products, incorporating in said alcohol product a polyamine having a total of about 2 to about 20 carbon atoms in the molecule which will not boil out but will remain in the distillation mixture at the distillation temperature throughout the distillation stage, and thereafter distilling said latter alcohol product.

7. A process as in claim 6 wherein the amine is triethylenetetramine.

8. A process as in claim 6 wherein the catalyst is an organic cobalt salt and the amine is triethylenetetramine.

9. A process as in claim 6 wherein the olefin is heptene, the metallic hydroformylation catalyst is an organic cobalt salt and the amine is triethylenetetramine.

References Cited in the file of this patent

UNITED STATES PATENTS

| | | |
|---|---|---|
| 1,847,711 | Calcott | Mar. 1, 1932 |
| 1,987,601 | Burke | Jan. 15, 1935 |
| 1,992,689 | Cox | Feb. 26, 1935 |
| 2,139,179 | Tulleners | Dec. 6, 1938 |
| 2,143,478 | Engs et al. | Jan. 10, 1939 |
| 2,227,485 | Bump | Jan. 7, 1941 |
| 2,352,164 | Burnham | June 27, 1944 |
| 2,441,848 | Sexton | May 18, 1948 |
| 2,441,849 | Sexton | May 18, 1948 |
| 2,570,403 | Stevens et al. | Oct. 9, 1951 |
| 2,614,072 | Carlson et al. | Oct. 14, 1952 |
| 2,631,970 | Barnes | Mar. 17, 1953 |
| 2,635,074 | Steitz | Apr. 14, 1953 |
| 2,648,694 | Mason | Aug. 11, 1953 |

FOREIGN PATENTS

| | | |
|---|---|---|
| 494,985 | Great Britain | Nov. 4, 1938 |